United States Patent [19]

Jahr, Jr. et al.

[11] Patent Number: 4,870,735
[45] Date of Patent: Oct. 3, 1989

[54] REFRIGERATION CABINET CONSTRUCTION

[75] Inventors: Richard T. Jahr, Jr., Conway, Ark.; Marcus N. Holt, St. Cloud, Minn.

[73] Assignee: White Consolidated Industries, Inc., Cleveland, Ohio

[21] Appl. No.: 214,779

[22] Filed: Jul. 5, 1988

Related U.S. Application Data

[62] Division of Ser. No. 80,750, Jul. 31, 1987, Pat. No. 4,826,040.

[51] Int. Cl.⁴ .................... B21D 53/08; B23P 15/26; B23P 19/04
[52] U.S. Cl. .......................... 29/157.3 C; 29/157.3 R; 29/460; 29/469.5
[58] Field of Search ................... 29/157.3 R, 157.5 C, 29/460, 464, 446, 526.1, 469.5; 312/116, 214; 156/297, 298; 62/16

[56] References Cited

U.S. PATENT DOCUMENTS

| | | | |
|---|---|---|---|
| 3,799,831 | 3/1974 | Griffiths | 156/297 |
| 3,904,721 | 9/1975 | Puterbaugh | 29/157.3 R X |
| 3,907,267 | 4/1975 | Griffiths | 29/157.3 C X |
| 3,912,005 | 10/1975 | Griffiths | 156/298 X |
| 3,948,407 | 4/1976 | Puterbaugh | 220/62 X |
| 3,948,410 | 4/1976 | Anderson | 220/62 X |
| 3,966,283 | 6/1976 | Puterbaugh | 312/214 |
| 4,006,947 | 2/1977 | Haag et al. | 312/214 |
| 4,033,806 | 7/1977 | Lindenschmidt | 312/214 X |
| 4,082,825 | 4/1978 | Puterbaugh | 312/214 X |
| 4,114,065 | 9/1978 | Horvay | 312/214 |

Primary Examiner—Timothy V. Eley
Assistant Examiner—Peter D. Vo
Attorney, Agent, or Firm—Pearne, Gordon, McCoy & Granger

[57] ABSTRACT

A refrigerated appliance cabinet for a chest-type freezer is formed from prefinished materials. The side walls of the shell and the liner are formed as a single piece, with the evaporator and condenser coils assembled before bending and after a thermal mastic has been applied to the places where the tubing contacts the sheet metal. The tubing is held in place by a hot melt adhesive. After the side walls are folded, bottom walls are attached mechanically and the liner inserted into the shell, with the space at the top being covered by a breaker strip arranged with the top edge of the liner and shell to provide air venting during foaming so that the foam can expand directly into contact with the underside of the breaker strip and adhesively hold it in place. The compressor compartment is attached mechanically to the shell around an opening, and the weight of the machinery is supported by that connection and the surrounding foam.

3 Claims, 4 Drawing Sheets

REFRIGERATION CABINET CONSTRUCTION

This is a division, of application Ser. No. 07/080,750, filed July 31, 1987 now U.S. Pat. No. 4,826,040.

BACKGROUND OF THE INVENTION

This invention relates generally to the construction of insulated refrigeration cabinets, and more particularly to cabinets used for chest-type food freezers having a generally open top covered by a horizontally hinged and upward opening door.

Chest-type food freezers comprise essentially a rectangular box construction comprising an insulated wall in which the insulation is usually a polyurethane foam. The outside of the box is a metallic outer shell, while within the box is a liner that is also generally made of metal, thus forming a box within a box with the space between being filled with foam insulation. By the use of a rigid polyurethane foam, considerable structural strength can be obtained by using relatively thin metal for both the outer shell and the inner liner. Around the open upper end of the box, a plastic thermal breaker strip is usually fitted over the insulation space to bridge the space between the shell and the liner and to provide a smooth finished surface. An insulated lid or door is hinged at the back and generally carries a deformable elastomeric gasket to make sealing contact with the breaker strip to minimize heat transfer between the inside and outside of the freezer.

In the case of chest-type food freezers, it has long been common practice not to use separate exposed evaporator and condenser elements for the refrigeration system, but rather to attach the coils of tubing directly to the respective metal liner and shell surfaces for most efficient heat transfer. Thus, the condenser takes the form of serpentine coils that are fastened to the inner surface of the outer shell, and the evaporator takes the form of similar coils which are secured to the outer surface of the inner liner, so that the shell and liner become the effective heat transfer surfaces for the appliance. The remaining portion of the refrigeration system is the compressor, which is usually housed in a compartment recessed into one end or a rear corner of the liner, which results in a step on the inside of the liner to accommodate the compressor compartment. The outer shell is then formed with suitable reinforcing in the area of the compressor compartment, as well as openings to allow air circulation for cooling. Thus, the outer shell in the area of the compressor compartment must be generally made heavier, since it is not stiffened by the foam insulation, and likewise a special insert must be placed to form the inner wall of the compressor compartment and to provide the outer surface for the foamed insulation area in the area of the stepped portion of the liner.

Chest-type food freezers are generally built in a number of different sizes, ranging from perhaps 10 through 25 cubic feet in capacity, and for ease of fabrication, such chests are often made with a fixed vertical height and depth, and thereby vary only in the length of the cabinet to determine the total capacity of the unit. With this type of construction, the larger units, which require more refrigeration capacity, necessarily have longer tubing lengths for the condenser and evaporator because of the longer front and back wall lengths of the larger size cabinets. Generally, such cabinets have been made from coils of sheet steel, with all four side walls of the shell and the liner each being formed from a single piece which is blanked and notched as required to form the upper and lower edges. After the blanking is completed, a preformed serpentine coil is laid on the appropriate surface and fastened in place by suitable means, such as welded straps, so that the tubing will remain in place as the sides, including the tubing, are bent into a rectangular shape and the ends secured together by a suitable means, such as welding. After this is done, the bottom pieces are welded in place and other parts, such as hinged tapping plates and the compressor mounting structure, are secured to the respective members, after which they are painted to provide the desired finish. When the shell and liner are complete, the liner is inserted in the shell and positioned by suitable means, such as insulating blocks, for the foaming operation, and suitable vent strips and spacers placed adjacent the upper end to close off the gap between the shell and liner, after which the foaming operation is performed. The finished cabinet is then ready for the application of the breaker strips, the attachment of the top, and the mounting of the compressor and the remaining portions of the assembly operation.

The foregoing procedure is a rather time-consuming and labor-intensive operation. One of the steps which is required before the liner and the shell are finally assembled is to apply a thermal mastic to the coil serpentines to ensure proper thermal conductivity between the tubing and the surface of the liner and shell. The thermal mastic material is generally applied by hand to both the shell and liner just before the liner is inserted into the shell in a time-consuming operation which requires high skill and a certain amount of wastage of the thermal mastic material as a result of excess application to get the required coverage.

Another problem is that the painting operations also require a high degree of skilled labor and expensive equipment associated with paint spray operations.

It has been recognized that the attachment of the coils to the shell and liner can be done with a much reduced labor requirement if methods other than welding straps can be used to attach the coils to the shell and liner. Furthermore, it is possible to eliminate the painting operation if prepainted sheets can be used if they can be fabricated without any welding which would ruin the prepainted surface. Furthermore, the use of methods other than welding permits the use of other materials such as aluminum and galvanized steel, which would make welding operations excessively difficult.

One such approach is to use an adhesive applied by dipping the liner, with the attached coils, into a vat of suitable adhesive. This arrangement has been shown by U.S. Pat. Nos. 3,799,831; 3,907,267; and 3,912.005, in the name of L. N. Griffiths. Another approach has been to hold the coils in place by a suitable clamping means and then use a spray of high-density polyurethane foam having sufficient structural strength to hold the coils in place, as shown in U.S. Pat. Nos. 3,904,721 and 3,966,283, in the name of R. L. Puterbaugh. Other approaches to the use of prepaint material are shown in U.S. Pat. Nos. 3,948,407 and 4,082,825, both in the name of R. L. Puterbaugh. However, these approaches still require excessive labor and material, and do not lend themselves to a fully automated type of assembly, which is required to reduce the labor content, and hence the costs, of the finished appliance.

SUMMARY OF THE INVENTION

The present invention is related to a refrigeration cabinet, and more particularly a chest-type freezer cabinet, which is particularly adapted to automated manufacture and assembly entirely from prefinished material which requires no further painting operations, either during assembly or after assembly has been completed. The cabinet comprises an inner liner and an outer shell each of which is completely formed from prepainted sheet steel or similar prefinished sheet, and the outer shell includes an integral compressor compartment, also formed from prefinished material. After the shell and the liner have been completely formed, the liner is fitted within the shell in the desired position, where it is held by foam blocks, and a breaker strip is applied across the gap between the liner and shell around the top edge. The cabinet is then foamed in a suitable fixture to fill all of the space between the shell and the liner with rigid polyurethane foam to form the finished cabinet, which then requires only assembly of the compressor, electrical components, charging and attaching a suitable door or cover over the top to provide a finished chest-type food freezer.

Another feature of the invention is the configuration and fit between the breaker strip and the liner and shell. The fit with both of these members and the breaker strip is in the form of a labyrinth-type seal, so that the foaming can take place with the breaker in place and the labyrinth-type seal allows venting of air from the insulation space as the foam expands and hardens, yet the sealing areas are so configured that they function as a foam stop when all of the air has been vented to ensure that the foam will harden within the seal areas to prevent the escape of any foam, which would then have to be removed from the exterior. This ensures adequate filling of the space beneath the breaker strip by the foam to ensure proper insulation in this area, as well as to provide reinforcing and support for the breaker strip. Because of the adhesive nature of the contact between the foam, the breaker strip, and the metal parts, the breaker strip is fastened to the shell and liner to ensure a rigid insulating structure without any separate fasteners or any other assembly operations.

Another feature of the invention is the application of strips of thermal mastic to both the liner and the shell at the proper locations before the tubing is attached, so that preformed coil assemblies for the evaporator and condenser tubing can be precisely formed and assembled in place, and held there by suitable clamping means. To hold the tubing in place, spots or strips of hot melt adhesive are then applied by suitable dispensing guns moved in the path transverse to the longitudinal axis of the tubing. After the hot melt adhesive is cooled and solidified, it adheres to both the metal sheet surface and the tubing to lock the tubing coils in place with a force that will hold them there even after the flat panels are bent and folded to form a complete wrap of all of the sides of either the shell or the liner as a single piece of sheet material. The application of the thermal mastic directly to the surface of the shell or liner before attaching the tubing ensures the formation of a bead having the optimum amount of thermal mastic material, which is then bisected by the tubing to ensure the formation of a smaller bead extending between the sheet and each side of the tubing. This arrangement, as compared to the conventional method of applying the thermal mastic after the tubing has been secured to the sheet, provides optimum location of the thermal mastic in contact with both the sheet and the tubing over a maximum area, with a minimum amount of material.

Still another feature of the invention is the construction of the compressor compartment which takes the form of a rectangular box open on one side and sealed on all of the other sides. The open side of the compressor compartment is secured by flanges and crimping to an opening in an end wall of the freezer shell a spaced distance above the bottom. When the cabinet is foamed, the foam extends around all of the closed sides of the compressor compartment to securely hold it in place with respect to the shell, and also serves to support the underside of the compartment a spaced distance above the bottom wall of the shell so that the compressor may be easily mounted on a set of detachable rails fastened to the bottom wall of the compartment.

DESCRIPTION OF THE PREFERRED EMBODIMENT

Figure 1:
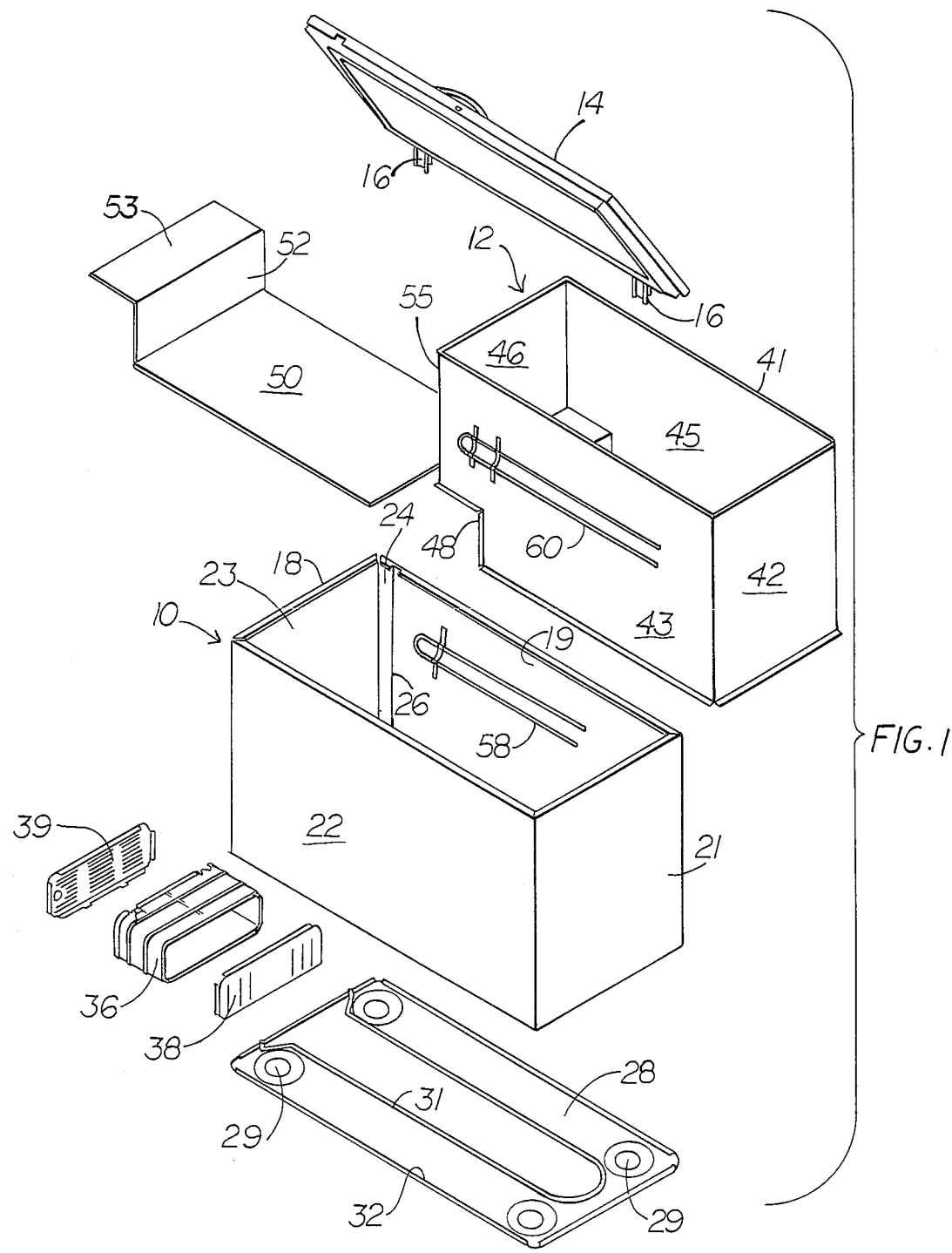
FIG. 1 is an exploded view of the major component parts of the chest freezer cabinet according to the preferred embodiment of the invention.

Referring to the drawings in greater detail, and in particular to FIG. 1, this figure shows, in exploded form, the major components of the cabinet of a chest-type freezer. Thus, the freezer includes a shell indicated generally at 10 within which is mounted a liner 12 forming the walls of the refrigerated compartment. The open upper side of the chest freezer is closed off by a cover 14 mounted on suitable hinges indicated at 16 and attached to the rear upper side of the shell 10.

In accordance with the present invention, the shell 10 has side walls formed from a shell wrap 18 in the form of a single metal panel of prepainted steel which may have a smooth or embossed outer surface. As explained in greater detail hereinafter, the shell wrap 18 is formed from blanks cut from a larger coil of prepainted steel which is cut to length and then formed by punching, stamping, and roll-forming to form the desired contours along the upper and lower edges and to provide notches for the subsequent folding of the shell. When the shell wrap 18 is formed into the finished shell 10. it includes a back wall 19 connected at a fold at one end to an end wall 21, which in turn is connected by a fold to the front wall 22. The other end of the front wall 22 is connected by a fold to the other end wall 23, which in turn is connected to a short wall 24, where it is connected to the end of the back wall 19 along a seam 26 to form the four side walls of a box. This seam may be formed in any of the standard folded seam types known in the art for rigidly connecting the ends together by an interlocking action without damaging the prefinished surface.

The lower side of the shell 10 is closed off by a bottom wall 28, preferably formed of a corrosion-resistant material such as galvanized steel. The bottom wall 28 is formed with projecting foot pads 29 which support the freezer in contact with the floor, and may project about one-half to one inch below the lower surface of the finished cabinet. Optionally, the bottom wall 28 may be used to mount an oil cooler line 31. which may be held in place by projection welding, since the bottom wall 28 does not form any part of a critical finished surface. The bottom wall 28 has an upwardly projecting side flange 32 for connection to the lower edge of the shell wrap, as explained in greater detail hereinafter.

Also shown in FIG. 1 is the compressor wrapper 36 which, together with a separate end wall 38 secured to it by folded seams, forms a housing for the compressor and its related equipment. The compressor wrapper 36 is attached to an opening formed in the shell end wall 23, and this opening may be closed off by a suitable grille 39, allowing air circulation into and out of the compressor compartment.

The liner 12 includes a liner wrap 41 comprising an end wall 42 joined along each of its vertical edges to front and back walls 43 and 45. The front and back walls 43 and 45 each have a rectangular cutout or notch 48 formed on the lower end adjacent the other or short end wall 46, and this serves to accommodate the compressor compartment at that end. The liner 12 also includes a bottom wall 50 extending across the lower edges of end wall 42 and front and back walls 43 and 45. The bottom wall has a vertical portion 52 and a horizontal stepped portion, 53 formed to correspond with the shape of cutouts 48. It will be understood that the wrap 41 is formed from a single metal sheet or panel of material with a finished surface on the inside and the edges joined together along a seam 55 formed at the juncture of front wall 43 and the short end wall 46 to form the four side walls of a box. It will also be understood that the liner wrap 41 may be formed with re-entrant flanges at the lower end to receive the bottom wall 50, and by the use of mechanical seams, together with appropriate staking, the liner can be completely formed from the two pieces. Also, as shown in FIG. 1, it will be understood that condenser tubing or coil 58 are mounted on the inside of the shell wrap 18 and evaporator tubing or coil 60 are mounted on the outer surface of the liner wrap 41 in a manner to be described in greater detail hereinafter so that the shell and liner each form heat exchange members.

Figure 2:
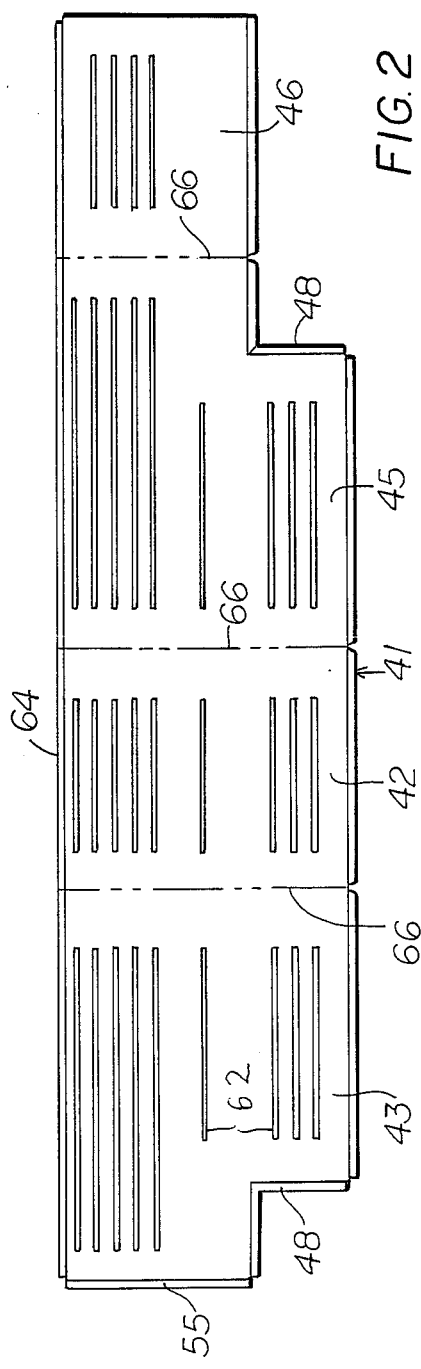
FIG. 2 is a plan view of the exterior surface of the liner showing the thermal mastic in place before assembly with the evaporator coil.
Figure 3:
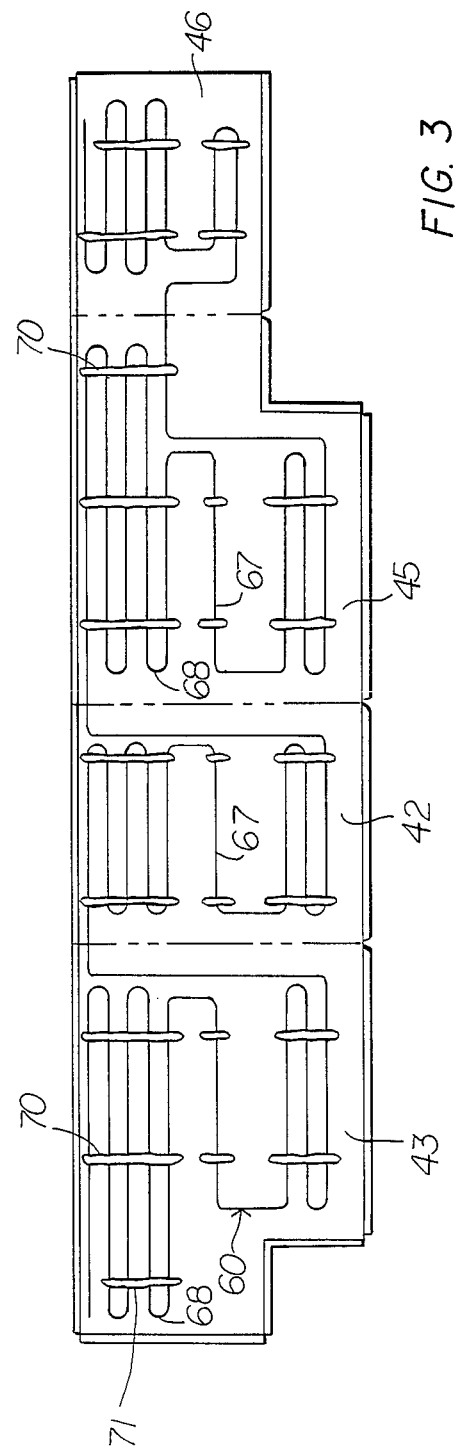
FIG. 3 is a view similar to FIG. 2, showing the evaporator coil in place and a hot melt adhesive applied.

FIGS. 2 and 3 illustrate the steps in assembling the evaporator coil 60 on the liner wrap 41 when it is in a flat condition and before it is folded into the rectangular shape shown in FIG. 1. It will be understood that the shell wrap 18 and condenser coil 58 are formed in a similar manner, except that the folds are in the opposite direction, since the condenser coil 58 is on the inner surface of the shell wrap 18. As shown in FIG. 2, the liner wrap 41 is formed from a sheet of prefinished material, preferably precut from a coil with the inside or finished surface on the bottom and the outer side exposed upwardly. Prior to the assembly of the evaporator coils 60, the sheet is formed by cutting out the notches 48 and the bottom of the short end wall 46, and the top edge 64 is formed, as described hereinafter, to provide a labyrinth seal with the breaker strip. The lower edges are notched and flanged to hold the bottom wall 50, and the seam ends 55 are also formed in an appropriate manner to allow an interlocking seam to be formed after the folding is completed.

Figure 4:
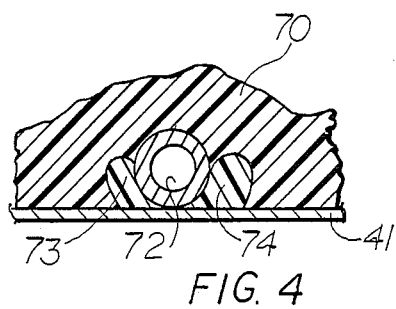
FIG. 4 is an enlarged, fragmentary, cross-sectional view. showing the tubing, liner, and thermal mastic at a typical point where the hot melt adhesive is located.

After all of the forming operations have been completed on the flat sheet, beads of thermal mastic 62 are placed in a predetermined pattern along the panels 43, 42, 45, and 46 extending parallel with the top edge 64 and spaced from the fold lines 66 to generally correspond to the horizontal or straight portion 67 of the evaporator coil 60. No effort is made to place the thermal mastic at the locations of the return bends 68. After the thermal mastic has been applied at the intended locations of the tube, generally in the form of a round bead in contact with the surface of the liner wrap, the evaporator coil 60, which has previously been formed with all of the return bends 68 in place, is placed in a suitable fixture to hold the various portions of the coil in the exact shape in which they are to be attached to the liner wrap 41. When this has been done by using a suitable holding fixture, the evaporator coil is then pressed downwardly into contact with the liner wrap 41, with the longitudinal or horizontal portions 67 directly on top of the thermal mastic beads 62. The coil is then pressed down until it is in contact with the liner wrap and the mastic is necessarily forced to the side, as better shown in FIG. 4. This causes the thermal mastic beads 62 to be split in half by the tube 72 and form two smaller beads 73 and 74, one on each side, so as to be in substantial contact with almost half of the circumference of the tube.

While the evaporator coil is damped and held in the desired position, strips of hot melt adhesive 70 are placed extending across the straight portions 67 adjacent the return bends 68. The hot melt adhesive, which is liquid but viscous, adheres to the tubing and to the liner wrap, and, as it cools and hardens, serves to hold the coil permanently in place on the sheet. If the portions 67 are spaced closely together, the hot melt adhesive may be placed either as a continuous strip extending across several runs of tubing as shown at 71, leaving gaps only where the spacing is wide to avoid wastage of material, or, alternatively, the hot melt adhesive may be placed at a single spot over the tubing which is noncontiguous with the hot melt on the adjacent tubing.

After the hot melt adhesive has cooled and hardened, the clamps can be removed and it is then possible to bend the liner wrap along the fold lines 66, and then form the seam 55 to complete the wrap. It should be noted that in the case of the liner, the tubing is preferably made with a small raised portion, since the folding leaves the tubing on the outside and the extra tubing is needed to go around the corner after the folding is completed. Once the liner has been folded and the seam 55 formed, the liner bottom 50 can be attached and the necessary seaming formed and staked to hold the liner bottom in position to complete the fabrication of the liner.

Figure 7:
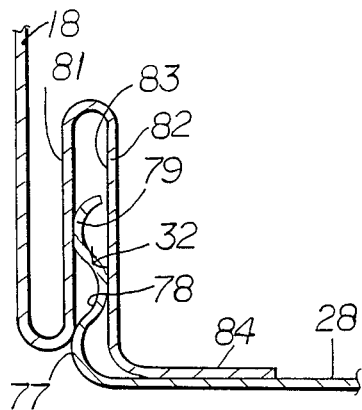
FIG. 7 is an enlarged, fragmentary view, showing the connection between the shell wall and shell bottom.
Figure 8:
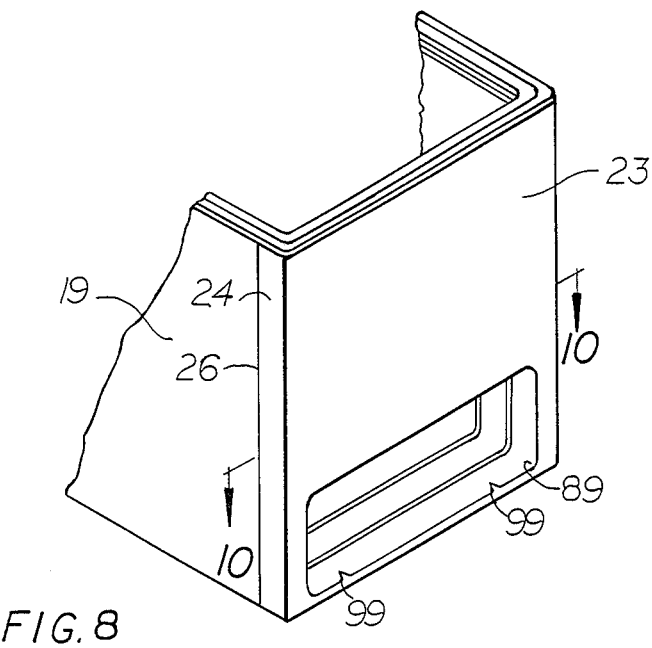
FIG. 8 is a fragmentary, perspective view of the compressor compartment mounted in the shell end.
Figure 9:
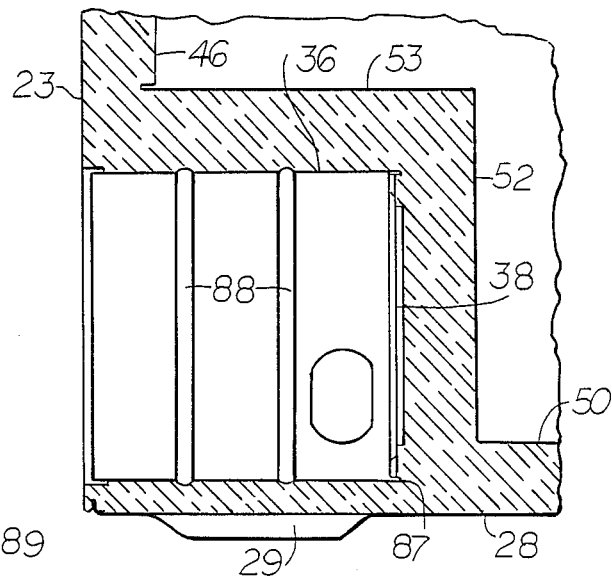
FIG. 9 is a vertical cross-sectional view through the compressor compartment showing the relationship between the compressor compartment, shell, and liner, taken on line 9—9 of FIG. 10.
Figure 10:
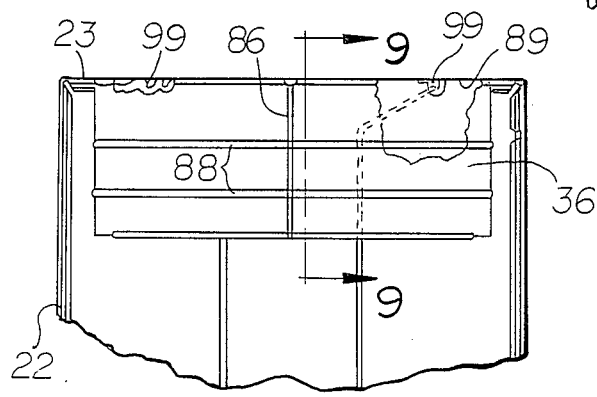
FIG. 10 is a fragmentary, cross-sectional view taken on line 10—10 of FIG. 8.

In the case of the shell, the bending is done the same way, and then the bottom wall is inserted and pressed in place. As shown in FIG. 7, it will be seen that the bottom edge of the shell 18 is formed with two return bends 81 and 82, with the second return bend 82 forming a groove 83 around the periphery of the shell. A flange 84 is formed to extend horizontally inward from the bottom of the second return bend 82. The bottom wall 28 is formed with a first right angle bend 77 to form an upwardly standing lip, which in turn is formed with a groove 78 and a ridge 79 that are configured to make a tight fit within the groove 83 at the bottom of the liner. Thus, when the bottom wall is assembled in place, with the edge in the groove 83, it can be determined that assembly is completed when the flange 84 engages the upper surface of the bottom wall 28, and by this frictional fit the bottom wall is held in place during subsequent handling. It will be understood, however, that this arrangement provides a seal and friction fit, but that after the foaming is complete, the adherence of the foam to the inner surface of the shell and the bottom wall serves, by its adhesive action, to hold the unit together in a permanent fashion.

Before the liner is inserted in the shell and the assembly made ready for foaming, it is first necessary to assemble the compressor compartment with the outer shell. As shown in FIGS. 8-11, the compressor wrapper 36 forms the top, bottom, and two side walls of the compartment. The wrapper 36 is formed as a single piece, bent into a rectangular shape, with the ends joined together along a seam 86 extending across the midpoint of the top wall. The wrapper 36 may be reinforced by forming projecting ribs 88 extending circumferentially around the walls, and it may be provided with knockouts or openings for appropriate piping and electrical wiring. The end wall 38 is secured directly to the wrapper 36 by a suitable crimped seam 87, so that the compartment forms a hollow box, open along one side.

To mount the compressor compartment and allow access to the interior thereof, the end wall 23 of the shell wrapper 18 is formed with an opening 89 a spaced distance above the bottom wall 28 and having the configuration of the cross section of wrapper 36. Around the opening 89 is formed an inwardly extending flange 91 integral with the wall and adapted to mount the wrapper 36 in the manner best shown in FIG. 11. The open end of the wrapper 36 is formed with first and second return bends 94 and 96, respectively, with the second return bend 96 having spaced-apart walls to form a slot 97 with a peripheral groove 98 on the outermost surface. The groove 98 cooperates with a bead 93 formed on flange 91 so that when the wrapper, with the end wall 38 already attached, is slipped over the flange 91, it will snap in place in a locking manner to hold the wrapper in the desired position. Although this interlocking relationship should be sufficient to hold the wrapper in place, it may be staked or crimped, as desired. although this is only needed for preliminary assembly purposes prior to foaming. It should be noted that at the lower end, the wrapper 36 may be formed with suitable notches or openings 99 to allow the tubing from the compressor, evaporator, and oil cooler to enter the compartment for connection to the compressor. Once the compressor wrapper is in place and the necessary arrangement made for having the tubing enter the compartment, the assembly may then be further completed. Spacer blocks of prehardened foam are then, in the customary manner, placed in the bottom of the shell and the liner inserted in position, with any necessary foam spacers prepositioned between the side walls. After this is done, the breaker strip may be attached as described hereinafter, the unit placed in an appropriate fixture, and the foaming operation completed.

Figure 5:
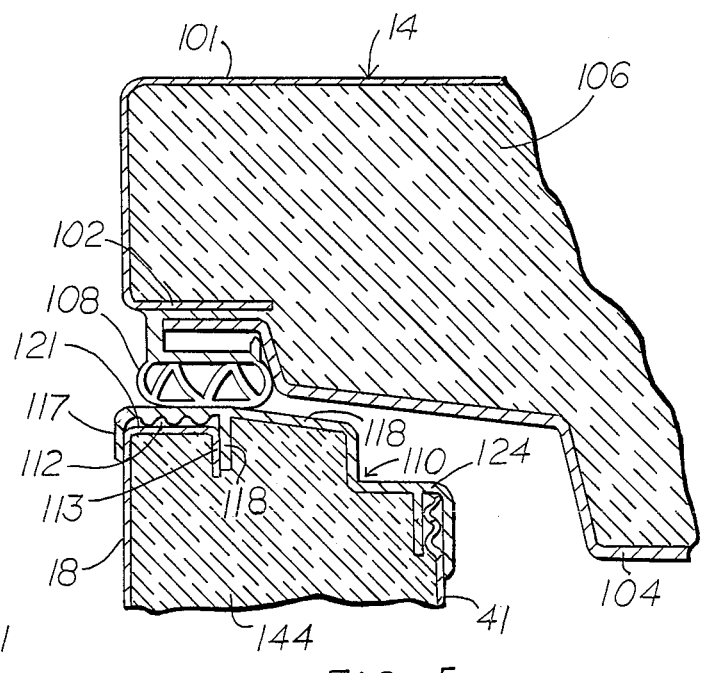
FIG. 5 is a fragmentary. cross-sectional view through the upper portion of the cabinet, showing the breaker strip in engagement with the lid and sealing gasket.
Figure 6:
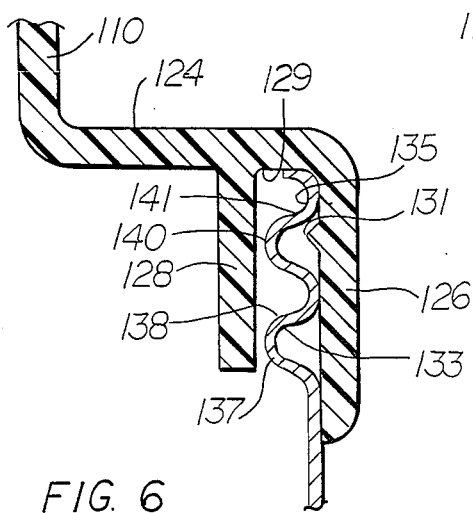
FIG. 6 is an enlarged, fragmentary, cross-sectional view, showing the fit between the breaker strip and liner.
Figure 11:
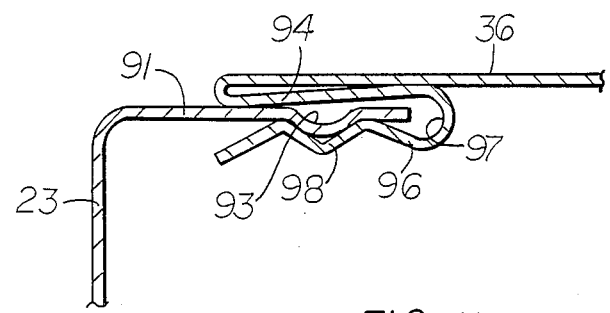
FIG. 11 is an enlarged, fragmentary view showing the mounting arrangement between the compressor compartment and the shell.

The details of the breaker strip mounting are best shown in FIGS. 5 and 6, where it will be seen, for purposes of illustration only, that the cover or door 14 includes an outer shell 101, preferably of metal, which forms a closed box terminating at its lower end with an inwardly extending horizontal flange 102. The inner side of the cover 14 includes a liner 104, which may be formed of a suitable plastic, and serves to enclose the insulation 106. A suitable gasket 108 is clamped between the flange 102 and liner 104 to make sealing contact with the breaker strip, as best shown in FIG. 5.

The breaker strip 110 is adapted to fit over and engage both the shell and the liner. As shown in FIG. 5, it should be noted that the shell wrapper 18 is formed along the upper edge with an inwardly extending horizontal ledge 112 terminating a spaced distance inwardly from the wall and a downwardly extending flange 113. The breaker strip 110 has a generally horizontal portion 116 which, at the outer side, terminates in a downwardly extending outer lip 117 which is in tight sealing contact with the outer surface of the shell wrapper 18. The breaker strip, which is formed of a suitable, rather rigid but somewhat flexible plastic material, also has a downwardly extending intermediate rib 118 which extends in close abutting contact with the downward flange 113 of the shell. The underside of the breaker strip between the outer lip 117 and an intermediate rib 118 is formed with a plurality of downwardly extending beads or ribs 121 which are arranged to make contact only at their crests with the upper surface of the horizontal ledge 112.

Inwardly of the horizontal portion 116, which is intended to make sealing contact with the gasket 108, the breaker strip 110 is formed with a downwardly extending step 124 to serve as a ledge on which wire baskets or the like may be placed to hold food within the freezer a spaced distance above the bottom of the liner. At its inner edge, the step 124 terminates in a downwardly inner lip 126 on the inner side of the liner wrap 41. The breaker strip 110 also has a rib 128 extending downwardly on the bottom side of the step 124 a spaced distance from the inner lip 126 to define a groove 129 of predetermined width. It should also be noted that the inner side of the lip 126 has a bead 131 for holding it in place, as described hereinafter.

The upper edge of the liner wrap 41 is formed with a pair of lower and upper corrugations 133 and 134. These corrugations form a lower rib 137 extending toward the rib 128 above which is formed a groove 138. In turn, above the groove 138 is a second or upper rib 140, which turns into an upper groove 141. The crest-to-crest spacing of the corrugations 133 and 135 is purposely made to have a distance less than the width of the groove 129, although the spacing between the inner lip 126 and outer lip 117 is such that these lips will make firm abutting contact with the liner wrap 41 and shell wrap 18. It should be noted that with this arrangement the bead 131 snaps over the upper corrugation 135 to assist in holding the breaker strip 110 in place.

When the chest is placed in a foaming fixture to rigidly support both the shell and liner against the forces created by the expanding foam, additional support must be provided to hold the preassembled breaker strip 110 in place as shown in FIG. 5. past the breaker strip during the foaming operation, since preferably no other vents are provided and the foam is introduced through a suitable foaming opening which may be located in an inconspicuous place on the shell or shell bottom. As the foam is introduced into the space between the shell and liner during the foaming operation, it is necessary to ensure that all of the air within the space be promptly and easily vented to the atmosphere so that the foam may rise completely to make sealing contact with the shell and liner at their upper edges and also with the undersurface of the breaker strip 110, so that the adhesive action of the foam holds all of these members together in the desired position. The fact that the ribs 121 make only spaced points of contact with the horizontal ledge 118 of the shell allows a certain amount of the trapped air to pass outwardly between the downward flange 113 and intermediate rib 118, through the space around the ribs 121, and then outwardly between the breaker strip outer lip 117 and the surface of the shell. However, it is intended that most of the air will escape around the seal at the top of the liner, as best shown in FIG. 6. Because of the location of the components, there will be a space between the surfaces of the ribs 137 and 140 and the side of the rib 128 that allows air to pass this area up into the bottom of the groove 129 and downwardly on the outside of the liner between the inner surface of the liner and the inner surface of the inner lip 126. When the foam does reach this area, it is initially restricted by the spacing between the lower rib 137 and the rib 128. As the foam does manage to pass this space, it then expands, and therefore more rapidly hardens, into the space provided by the groove 138. If the groove 138 becomes filled, then in the same manner the foam must again expand through the space between the upper rib 140 and the rib 28 to undergo a further expansion in the upper groove 141. It has been found that when the foam charge is properly measured, only a minimal amount of foam will reach the upper groove 141, and thus there is no chance of the foam escaping behind the bead 131 into the interior of the liner. Likewise, the engagement between the ribs 121 and the horizontal ledge 112 provides a similar labyrinth seal at this point by providing alternate points of restriction and expansion which limit foam travel.

When the foaming operation is complete, a foam insulation 144 will almost completely fill all of the space underneath the breaker strip 110 to ensure adequate contact so that the adhesive action of the foam will hold the breaker strip in place. Furthermore, by avoiding voids in this area, the insulating properties of the foam are at a maximum and the rigidity of the foam allows the use of a relatively thin material for the breaker strip 110, since the support provided by the rigid foam will prevent any damage to the breaker strip from blows or pressure from above.

It will also be seen that as the foam insulation 144 fills all of the space between the shell and liner, it serves not only to cause complete adhesion of the shell and liner to the foam as an integral unit, but also extends beneath the compressor wrapper 36 so that all of the space between the bottom of the wrapper 36 and the shell bottom wall 28 is filled with foam to not only lock the compressor wrapper 36 in place but to also provide adequate support so that the compressor may be mounted directly on the bottom wall, which is now supported by the layer of foam between it and the shell bottom wall 28. Thus, an extremely rigid and well-insulated cabinet is formed with a minimum of steps and finishing work after the foaming has been completed.

Although the preferred embodiment of this invention has been shown and described, it should be understood that various modifications and rearrangements may be resorted to without departing from the scope of the invention as disclosed and claimed herein.

What is claimed is:

1. The method of manufacturing a heat exchange member of a refrigeration cabinet of the type having a sheet metal panel and a metal tube secured thereto in heat transferring relationship comprising forming the panel, forming the tube to have a predetermined configuration, applying beads of thermal mastic to the panel at predetermined locations corresponding to the intended location of the tube on the panel, placing the tube on said panel at a predetermined position with the tube in abutting contact with said panel and said mastic beads, clamping said tube to said panel, applying a hot melt adhesive to said tube and said panel at a plurality of predetermined locations, allowing the adhesive to cool, and thereafter unclamping the tubing.

2. The method as set forth in claim 1, wherein said panel is flat after forming and said panel is bent after unclamping along fold lines into four side walls of a box.

3. The method as set forth in claim 1, wherein said bead of thermal mastic and said tube are so positioned that assembly of said tube on said panel causes said bead to be split into two smaller beads, one on each side of said tube.

* * * * *